(12) United States Patent
Haas et al.

(10) Patent No.: US 12,656,597 B2
(45) Date of Patent: Jun. 16, 2026

(54) ACTUATOR-SENSOR SYSTEM AND FAST STEERING MIRROR (FSM) HAVING AN ACTUATOR-SENSOR SYSTEM OF THIS TYPE

(71) Applicant: MICRO-EPSILON-MESSTECHNIK GmbH & Co. K.G., Ortenburg (DE)

(72) Inventors: Harald Haas, Ruhstorf a.d. Rott (DE); Reinhold Hoenicka, Bad Griesbach (DE); Tobias Schopf, Haarbach (DE); Guenter Schallmoser, Ruhstorf (DE)

(73) Assignee: MICRO-EPSILON-MESSTECHNIK Gmbh & Co. K.G., Ortenburg (DE)

( * ) Notice: Subject to any disclaimer, the term of this patent is extended or adjusted under 35 U.S.C. 154(b) by 336 days.

(21) Appl. No.: 18/547,785

(22) PCT Filed: Feb. 22, 2022

(86) PCT No.: PCT/DE2022/200025
§ 371 (c)(1),
(2) Date: Aug. 24, 2023

(87) PCT Pub. No.: WO2022/184214
PCT Pub. Date: Sep. 9, 2022

(65) Prior Publication Data
US 2024/0134183 A1 Apr. 25, 2024
US 2024/0231076 A9 Jul. 11, 2024

(30) Foreign Application Priority Data
Mar. 4, 2021 (DE) .................... 10 2021 202 120.4

(51) Int. Cl.
G02B 26/08 (2006.01)
G01B 7/00 (2006.01)
G02B 7/18 (2021.01)

(52) U.S. Cl.
CPC ......... G02B 26/0816 (2013.01); G01B 7/003 (2013.01); G02B 7/181 (2013.01)

(58) Field of Classification Search
CPC ..... G02B 26/0816; G02B 7/181; G01B 7/003
(Continued)

(56) References Cited

U.S. PATENT DOCUMENTS 6,206,290 B1 3/2001 Giebel
9,354,422 B1 5/2016 Quakenbush
(Continued)

FOREIGN PATENT DOCUMENTS

DE 102014214439 A1 1/2016
JP 2003152488 A 5/2003
(Continued)

OTHER PUBLICATIONS

International Written Opinion issued in App. No. PCT/DE2022/200025, dated, 7 pages.

*Primary Examiner* — Sharrief I Broome
(74) *Attorney, Agent, or Firm* — FisherBroyles, LLP; Jason P. Mueller

(57) ABSTRACT

An actuator-sensor system for controlled diverting or deflecting of electromagnetic radiation in at least one axis (9), with an actuator (5) for mechanically moving a deflecting element (10) and with a measuring element (2) for sensing the position of the deflecting element (10), where the measuring element (2) includes a flat substrate (3) having at least one sensor element (4). Furthermore, the present disclosure relates to a fast steering mirror (FSM).

15 Claims, 11 Drawing Sheets

Figure 1:
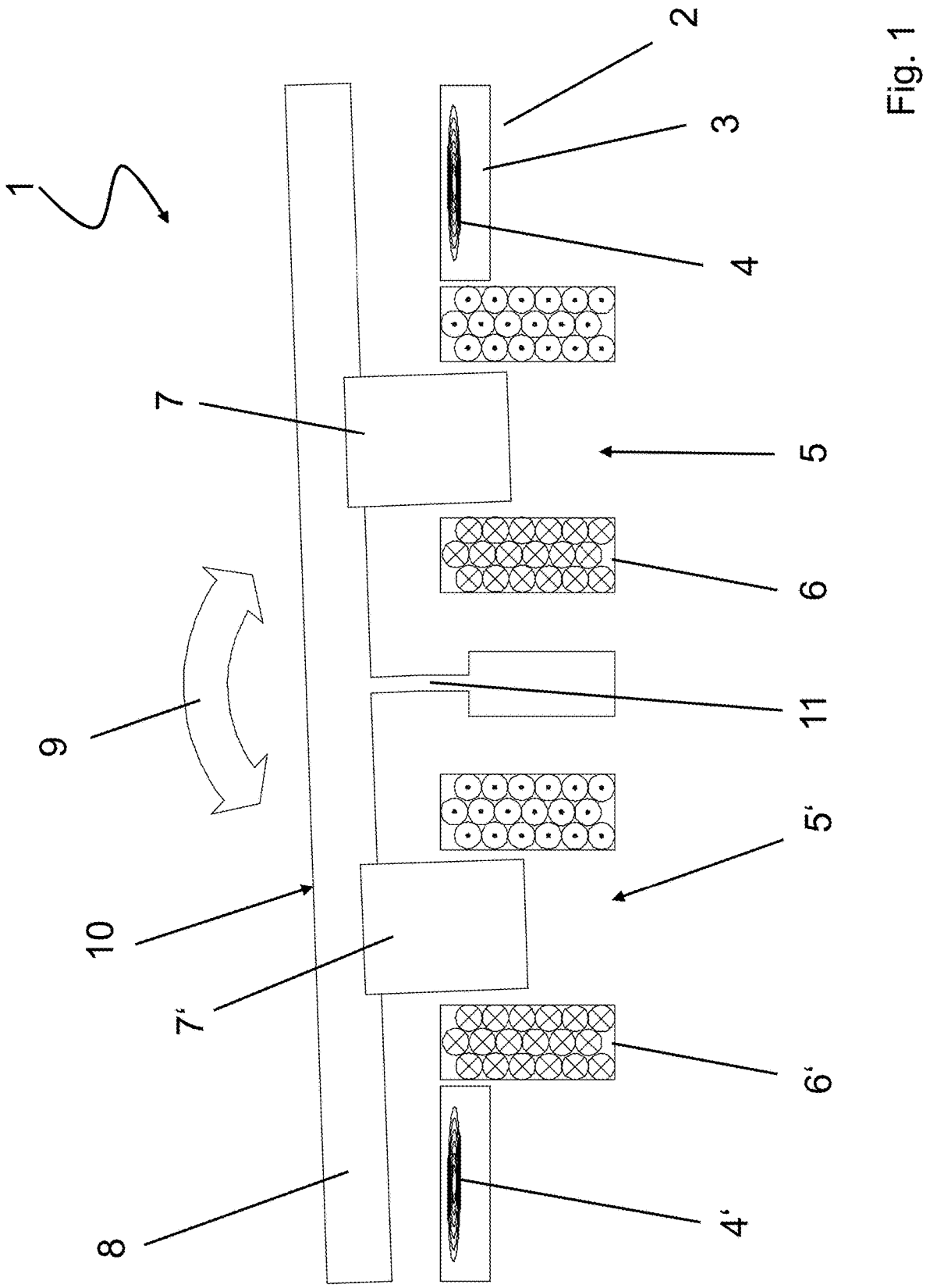

(58) Field of Classification Search
USPC .......................................................... 359/223.1
See application file for complete search history.

(56)                          References Cited

U.S. PATENT DOCUMENTS

| | | | | |
|---|---|---|---|---|
| 9,746,665 | B1 * | 8/2017 | Quakenbush | ...... H02K 41/0352 |
| 2005/0046979 | A1 | 3/2005 | Hiley | |
| 2008/0174303 | A1 * | 7/2008 | Anderson | .............. G01D 5/208 |
| | | | | 324/207.17 |
| 2008/0310001 | A1 | 12/2008 | Bernstein | |
| 2010/0091120 | A1 * | 4/2010 | Nagata | ................. H04N 23/687 |
| | | | | 359/557 |
| 2017/0242242 | A1 | 8/2017 | Bullard | |
| 2020/0041781 | A1 * | 2/2020 | Schitter | ..................... H01F 7/14 |
| 2021/0021771 | A1 * | 1/2021 | Kimura | .................... G03B 5/02 |
| 2021/0141404 | A1 * | 5/2021 | Takahara | ............... H02N 2/142 |
| 2021/0165237 | A1 * | 6/2021 | Kimura | ............... H04N 13/239 |
| 2022/0113406 | A1 * | 4/2022 | Cho | ...................... G01S 7/4817 |
| 2022/0170729 | A1 * | 6/2022 | Bartos | ................. G01D 5/2073 |

FOREIGN PATENT DOCUMENTS

| | | | |
|---|---|---|---|
| JP | 2004151627 | A | 5/2004 |
| JP | 2006204006 | | 8/2006 |
| JP | 2009542174 | A | 11/2009 |
| JP | 2015132762 | | 7/2015 |
| JP | 2017068205 | | 4/2017 |
| JP | 2017534075 | A | 11/2017 |
| JP | 2018194587 | | 12/2018 |
| JP | 2020143786 | A | 9/2020 |
| WO | 2022184214 | A1 | 9/2022 |

* cited by examiner

ACTUATOR-SENSOR SYSTEM AND FAST STEERING MIRROR (FSM) HAVING AN ACTUATOR-SENSOR SYSTEM OF THIS TYPE

CROSS REFERENCE

This application is a national stage entry application under 35 U.S.C. 371 of PCT Patent Application No. PCT/DE2022/200025, filed Feb. 22, 2022, which claims priority to German Patent Application No. 10 2021 202 120.4 filed Mar. 4, 2021, the entire contents of each of which are incorporated herein by reference.

TECHNICAL FIELD

The present disclosure relates to an actuator-sensor system for controlled diverting or deflecting of electromagnetic radiation in at least one axis, with an actuator for mechanically moving a deflecting element, and with a measuring element for sensing the position of the deflecting element. Furthermore, the present disclosure relates to a fast steering mirror (FSM).

BACKGROUND

Actuator-sensor systems are used in numerous applications where movements have to be carried out in a controlled manner. Ranging from single-axis movements to two- and multiaxis movements, there is a large number of actuators that are controlled by sensors in such a way that a controlled and regulated movement is caused in one or more directions or axes. The sensor signal serves as feedback for the actual position of the actuator. This position is compared with the setpoint position in a controller, and a control signal for controlling the actuator is generated therefrom.

In most cases, two sensors per axis in a differential arrangement (sensor A-sensor B) are used as sensors for position detection. Since sensor A and sensor B face each other and the rotatable mount is arranged in between, sensitivity is almost doubled with an almost linear output signal. Known sensors that are suitable here are inductive or eddy current sensors, capacitive sensors, or optical sensors.

Conventional sensors usually have a large design, which is due to the sensor element itself, the housing, the connection (cable or plug) or their interaction. However, for technical reasons and above all for cost reasons, a compact design is often desirable. This applies in particular to applications where low weight or a particularly small design is required, for example in the aerospace industry. Since two sensors are required for single-axis actuator-sensor systems (in a differential arrangement) and four sensors for two-axis actuator-sensor systems, the size of the sensors has a decisive influence on the overall size of the actuator-sensor systems.

For a differential arrangement, there is a mechanical center point (zero point) and an electrical center point (zero point) due to the design. The state of the art is to match these two midpoints as precisely as possible by mechanical adjustment processes (adjustment of the individual sensors). This is time-consuming in practice and only successful up to a residual error. In addition, a mechanical mount is required for at least one, usually for both sensors, which enables the adjustment and subsequent fixing of the sensor. Such devices are expensive and also increase the installation space. A separate electrical connection must also be created for each sensor. Calibration of the differential sensor arrangement is only possible after adjustment and fixation.

For the differential arrangement of the sensors, it is advantageous with regard to linearity and temperature behavior if the two sensors of the sensor pair behave as identically as possible to one another.

For this reason, sensors based on wound coils (such as inductive or eddy current sensors) are subjected to a downstream matching process to identify sensors of the same type. Usually this is done at two distances within the measurement range. However, due to the additional step, this means higher production costs, especially since the sensors that have not found a "partner" have to be measured again at the next match. In addition, the matching process is by no means perfect, because in order to be able to find a significant number of pairs at all, a certain deviation between the measured initial values at the two distances must be allowed. There is also no matching at all with regard to the temperature behavior of the individual sensors because this is too complex and too expensive.

A conductive connection is required to connect the sensors to the downstream evaluation circuit. This is usually achieved using shielded coaxial cables or flexible printed circuit boards.

To be able to contact the respective sensor, additional production steps are required. This makes production expensive and reduces reliability, especially since each additional connection is also a potential weak point (interruption or short circuit). The issue is further aggravated when there are external influences such as temperature fluctuations, shock, and vibration.

Such actuator-sensor systems are widespread where optical signals have to be diverted or deflected in a targeted manner (so-called fast steering mirrors—FSMs). In addition to the actual actuator-sensor system, FMSs also contain a deflecting element with which optical signals can be diverted or deflected. In semiconductor production, for example, they guide the laser beam that separates the dies onto a wafer. Furthermore, FSMs are used for rapid target tracking or as image stabilizers in military applications. They are also often used in optical scanners (3D), in 3D printing, or for projections on large screens.

FSMs regularly consist of a reflective surface (mirror), a movable element that also serves as a mount for the mirror (for one or two axes), drive units (electromagnets, actuators) for positioning the mirror, and sensors that record the actual position of the mirror mount and thus capture the reflecting surface. FSMs are operated as controlled systems by comparing the actual position with a desired setpoint position and transmitting corresponding control signals to the drive units.

SUMMARY

The present disclosure is now based on the object of eliminating the problems occurring in the prior art as far as possible. In addition, the actuator-sensor system according to the present disclosure and the fast steering mirror (FSM) according to the present disclosure should differ from competitive products.

This object is attained by the features of claim 1. According to this, the known actuator-sensor system includes a measuring element including a flat substrate which comprises at least one sensor element.

With regard to the FSM according to the present disclosure, the above object is achieved by the features of independent claim 14, according to which the FSM induces an actuator-sensor system according to the present disclosure.

According to the present disclosure, it has been recognized that the design of an actuator-sensor system can be significantly reduced and its production and function can be significantly improved if the discrete sensors are replaced by a measuring element that includes a flat substrate that contains one or more sensor elements.

The measuring element is arranged in the actuator-sensor system in such a way that it can detect the position of a movable element. The movable element is moved by means of one or more actuators, for example tilted about an axis. A mount is connected to the movable element and contains a deflecting element that is suitable for deflecting optical signals (or, in general, electromagnetic radiation). Deflecting elements can be optical elements such as mirrors, prisms, lenses or, diffraction gratings.

The mount is mounted via the movable element in such a way that movement can be carried out in one or more directions or about one or more axes. For example, the movable element can be tilted using a line or point bearing. Alternatively, a fixed bearing, for example in the form of a bending element, can also be used.

It is advantageous if the deflecting element is arranged on a movable element (for example as a coating) or is designed as part of the movable element and if the movable element has a waistline within which the measuring element is arranged. In the context of this disclosure, the term "waistline" means a radial constriction or tapering of the moving element. Above and below the waistline, the movable element has a larger cross-section than in the waistline. The deflecting element can be attached above the waistline. The magnets (or the magnetic material) for the actuator, with the help of which the movable element is moved, can be attached below the waistline. This gives the actuator-sensor system a very compact, flat design. Due to the arrangement of the measuring element within the waistline, it does not protrude in the radial direction or only slightly beyond the movable element. Due to the flat design of the measuring element, the height of the movable element with the waistline can be kept very low.

It is advantageous if the movable element is formed from two parts which are firmly connected to one another. The upper part can carry the deflecting element, the lower part can carry the magnet(s) (or the magnetic material) for the actuator(s). The movable element can be movably mounted via a bending element. The bending element can be attached either to the upper part or to the lower part or a combination of both.

The movable element can be made of turned parts that are easy to manufacture. The measuring element is then designed as a ring-shaped substrate which is inserted between the upper and lower parts of the movable element during assembly. The measuring element can be rigidly connected to the housing or the support structure of the actuator-sensor element. The sensor elements can be arranged in the measuring element in such a way that in each case one sensor element sits above an actuator. Alternatively, however, the sensor elements can also be offset by 45°, for example, with respect to the actuators. This reduces the influence of the actuators. However, a different arrangement, for example with only three sensor elements at an angle of 120°, is also conceivable. In an embodiment, the movable element is made of a metal. As a result, the measuring element is shielded from the actuator by its lower part from the underside, such that the interfering influences of the actuator on the measuring element are reduced. Regardless of its exact design, the movable element can preferably serve as a holder for the deflecting element and represent the target for the sensor elements. It is also conceivable to attach the magnets of the actuators thereto.

The measuring element can be arranged in such a way that the sensor element is located next to the actuator. This allows a particularly flat design. However, the measuring element can also be arranged such that the sensor element is located between the actuator and the movable element, for example in the air gap that is formed in the actuator between the coil and the magnet (or magnetic material).

The measuring element is designed as a predominantly flat, planar substrate and can be made of ceramic or printed circuit board material, for example. In its simplest form, the substrate is designed as a single layer, but it can also consist of several layers.

Sensor elements can be arranged on or in the substrate. For example, sensor elements of capacitive sensors can be arranged on the surface of the substrate by forming the flat electrodes on the surface in a known manner. Sensor elements of inductive or eddy current sensors can be arranged either as a single-layer coil on the surface or as a multi-layer coil within the layers of the substrate.

It is advantageous if the substrate contains a number of sensor elements. A differential sensor arrangement can thus be achieved in a simple manner, for example by arranging two sensor elements next to one another (or opposite one another) on or in the substrate such that the object to be measured is detected by both sensor elements. Differential arrangement means that, during a movement, one sensor element detects the approach of the measurement object and the other sensor element detects the distance from the measurement object. The difference between the two signals is often linear, even without additional circuit measures. Furthermore, this eliminates interference that affects both sensor elements in the same way, such as temperature influences or electromagnetic interference.

In another embodiment, movements in a number of directions can be detected simultaneously by means of a number of sensor elements, for example a tilting about two axes.

It is advantageous if a differential arrangement is selected for each direction of movement, in that two sensor elements together detect one direction of movement independently of the other direction of movement. Such an actuator-sensor system can, for example, move a mirror independently of one another in two axes arranged at 90°, such that light beams can be deflected into any solid angle. The solid angle is limited by the tilting angle about the respective axis. In the case of two-axis movement, four sensor elements are not absolutely necessary, but three in an arrangement of approximately 120° to one another will suffice. The differential evaluation then requires a more complex but known mathematical calculation.

Ideally, the measuring element only needs one connection for contacting the sensor elements. This can be a plug that is arranged on the substrate. A flexible conductor track could also be integrated into the substrate, which represents a freely installable, very thin electrical connection, especially where space is limited.

Electronic components for an electronic circuit could also already be arranged on the substrate. In the simplest case, a preamplifier could be implemented for the sensor elements to adapt and amplify the signals at the very front. As a result, any interference affecting the lines has little or no effect. It would also be conceivable to accommodate the entire evaluation electronics on the substrate. Furthermore, even the control electronics for the actuator could be integrated.

In addition, one or more temperature sensors could be arranged on the substrate. The temperature could thus be measured within the actuator-sensor system and, if necessary, temperature influences on the measured values of the sensors could be compensated.

If the sensor elements are integrated into the substrate in a manufacturing process, they are arranged firmly and precisely with respect to one another.

For example, if the sensor elements are manufactured from copper layers using conventional printed circuit board technology, the geometric dimensions of the coils or electrodes are all approximately the same due to the manufacturing process.

The conductive paste used in the process of "printing" the conductor structure on the raw ceramic substrate is also the same for all sensors when manufacturing the ceramic substrate.

Since in both cases all sensor elements on the substrate have gone through the same manufacturing steps, the sensors behave almost identically to one another. The electrical values (such as ohmic resistance, inductance, capacitance, impedance) and also the temperature behavior of the sensor elements are almost identical. Subsequent matching or selection can thus be completely eliminated.

Figure 2:
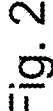
Figure 3:
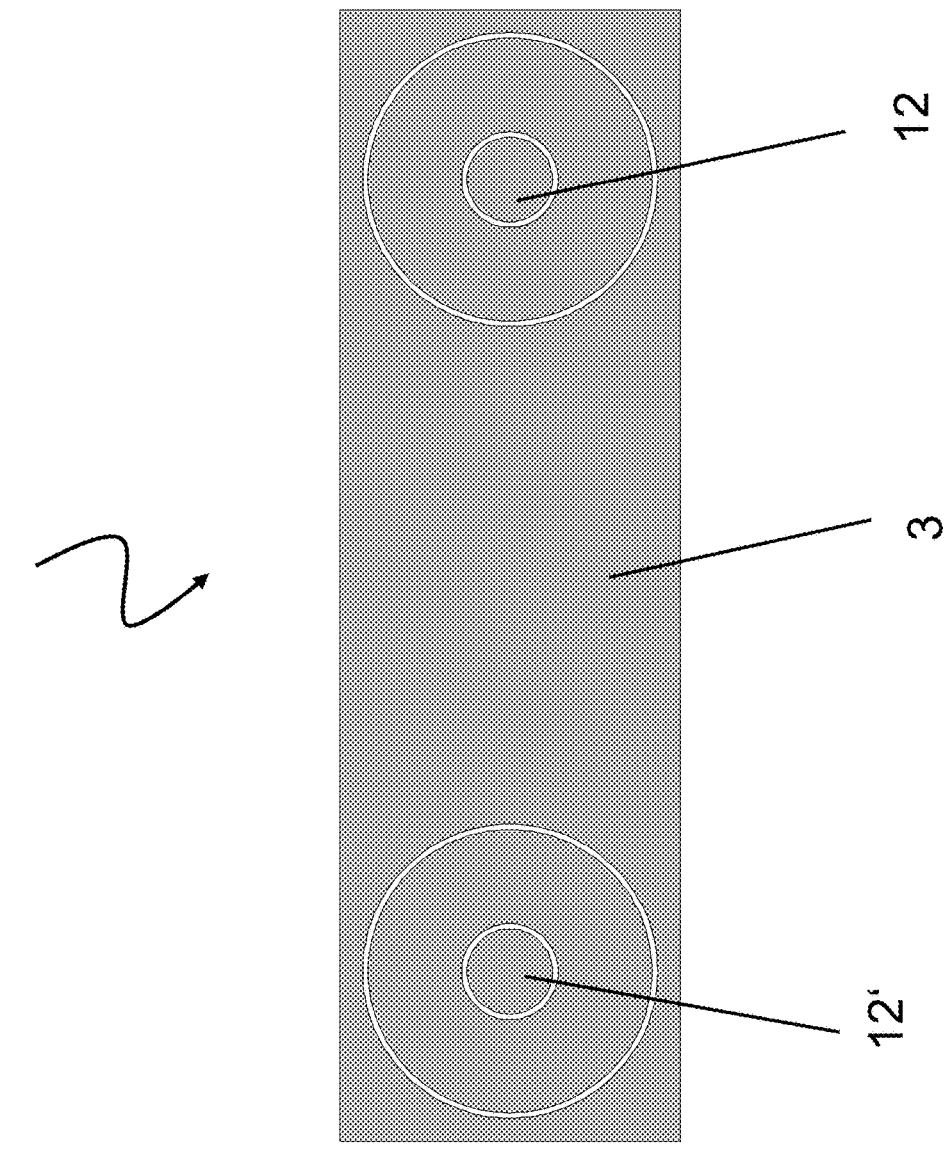
Figure 4:
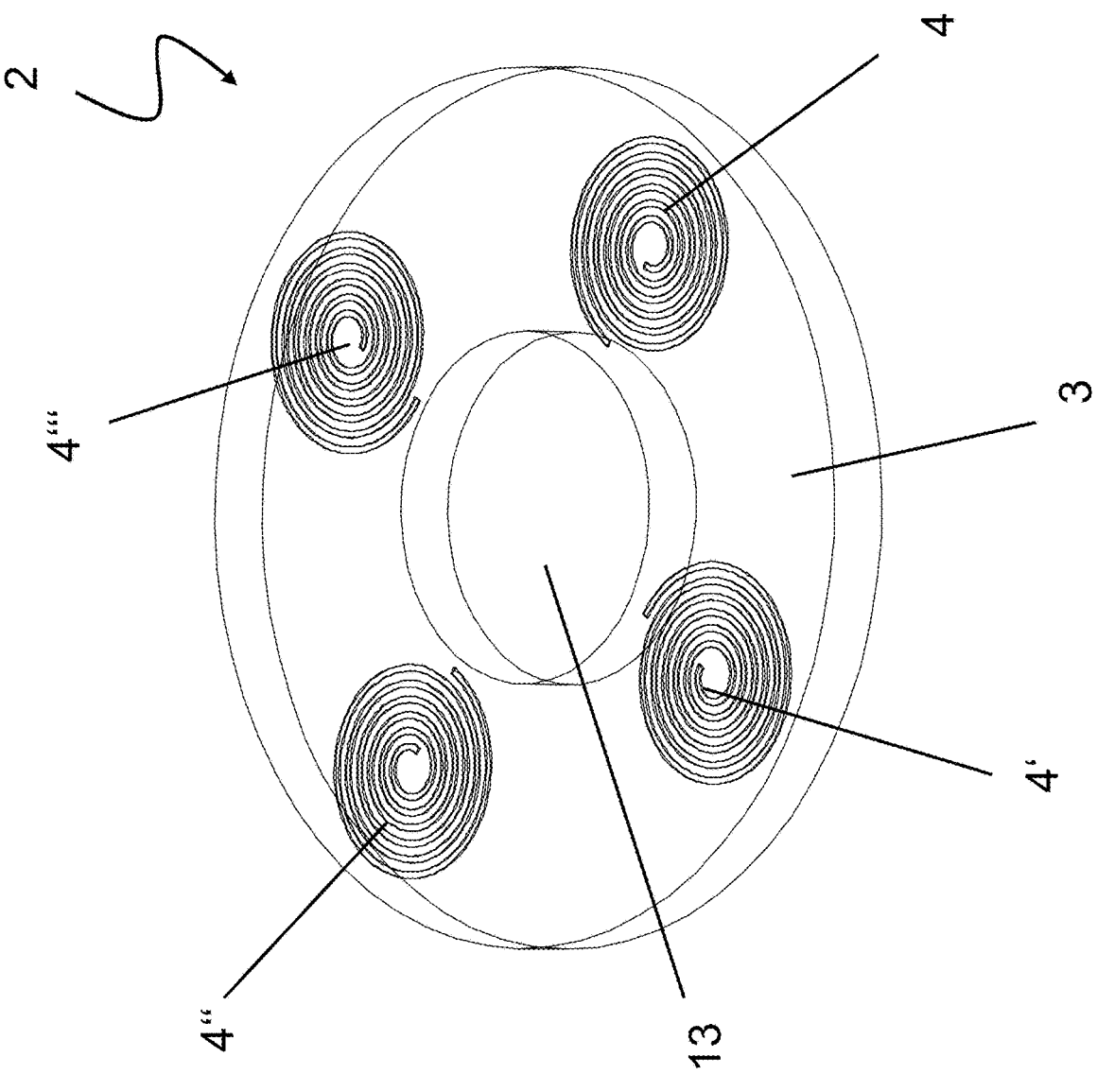
Figure 5:
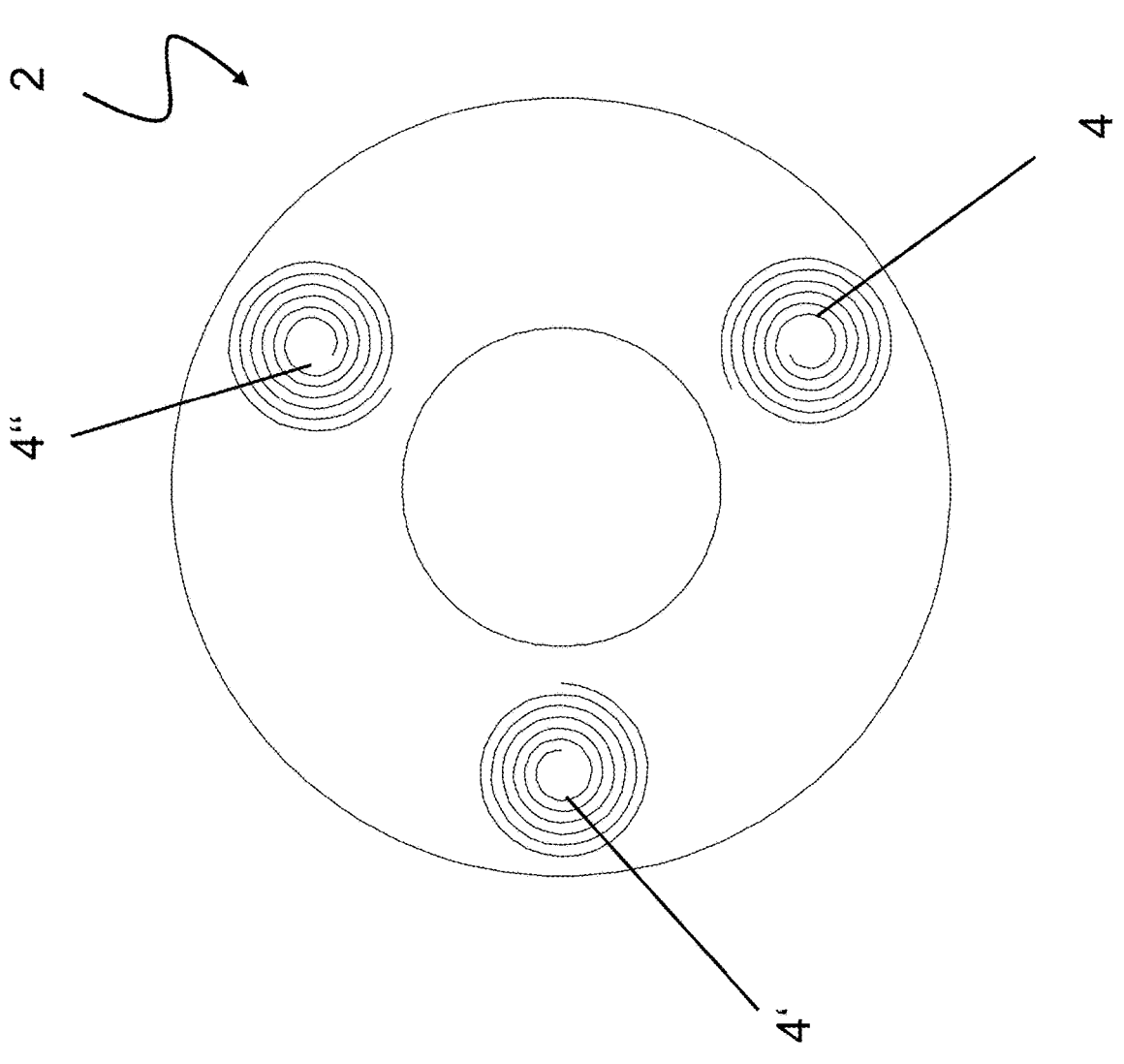
Figure 6:
Figure 7:
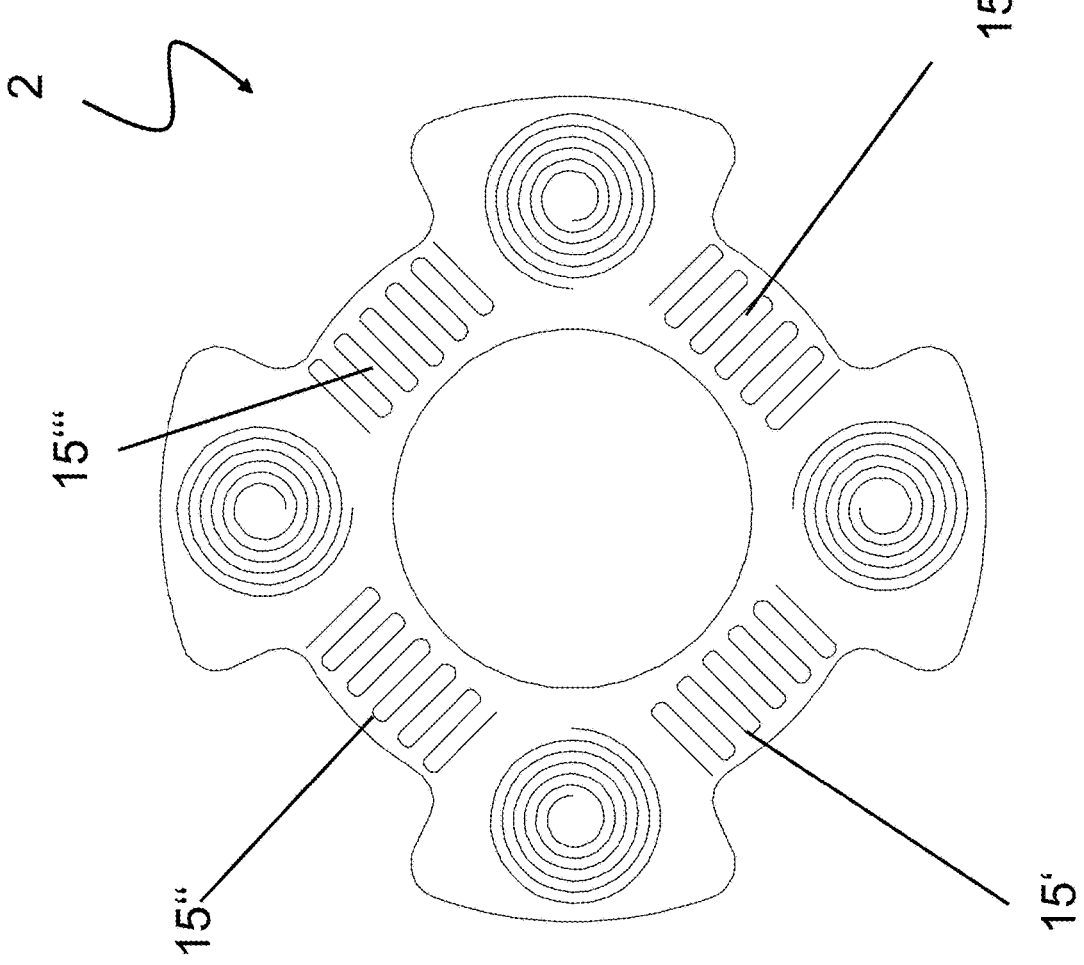
Figure 8:
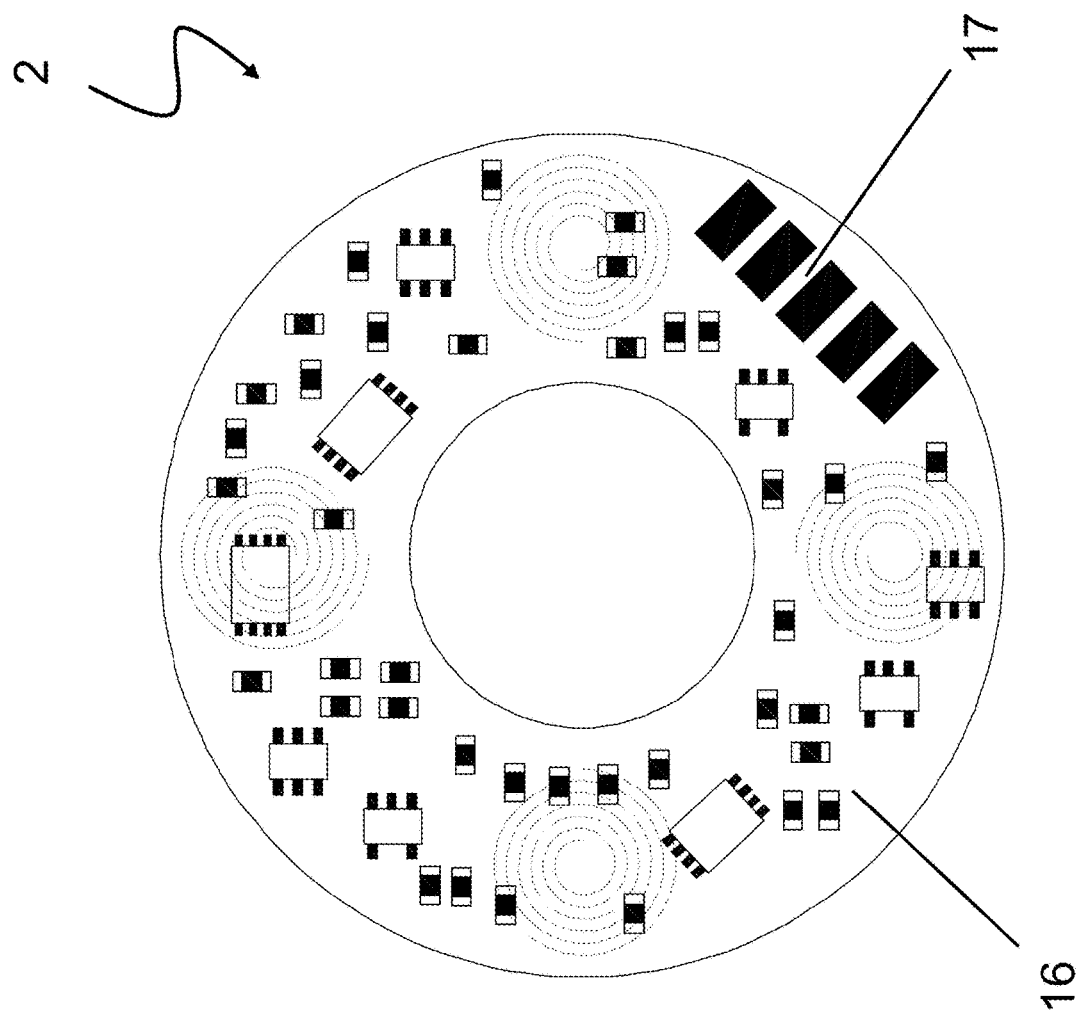
Figure 9:
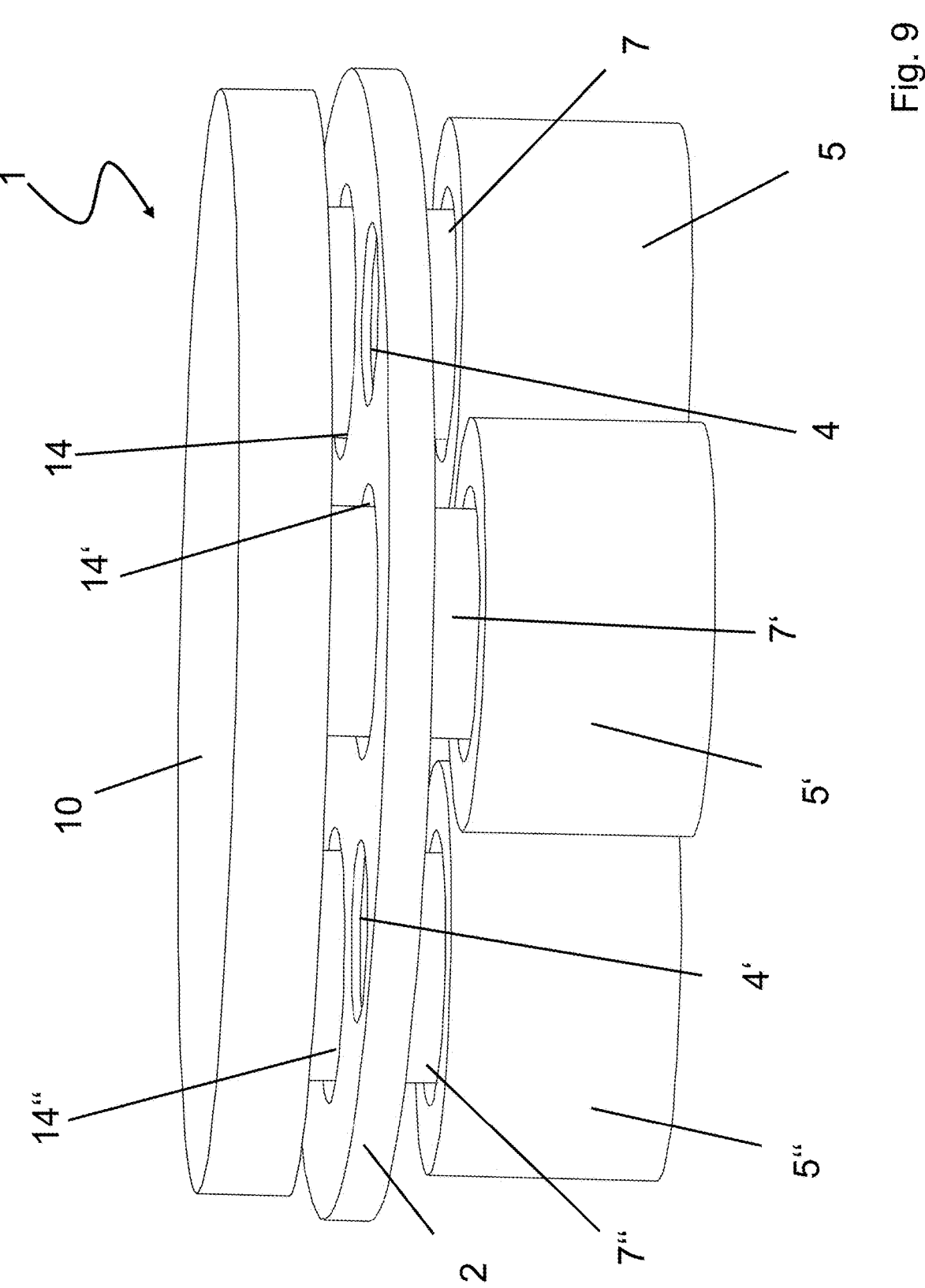
Figure 10:
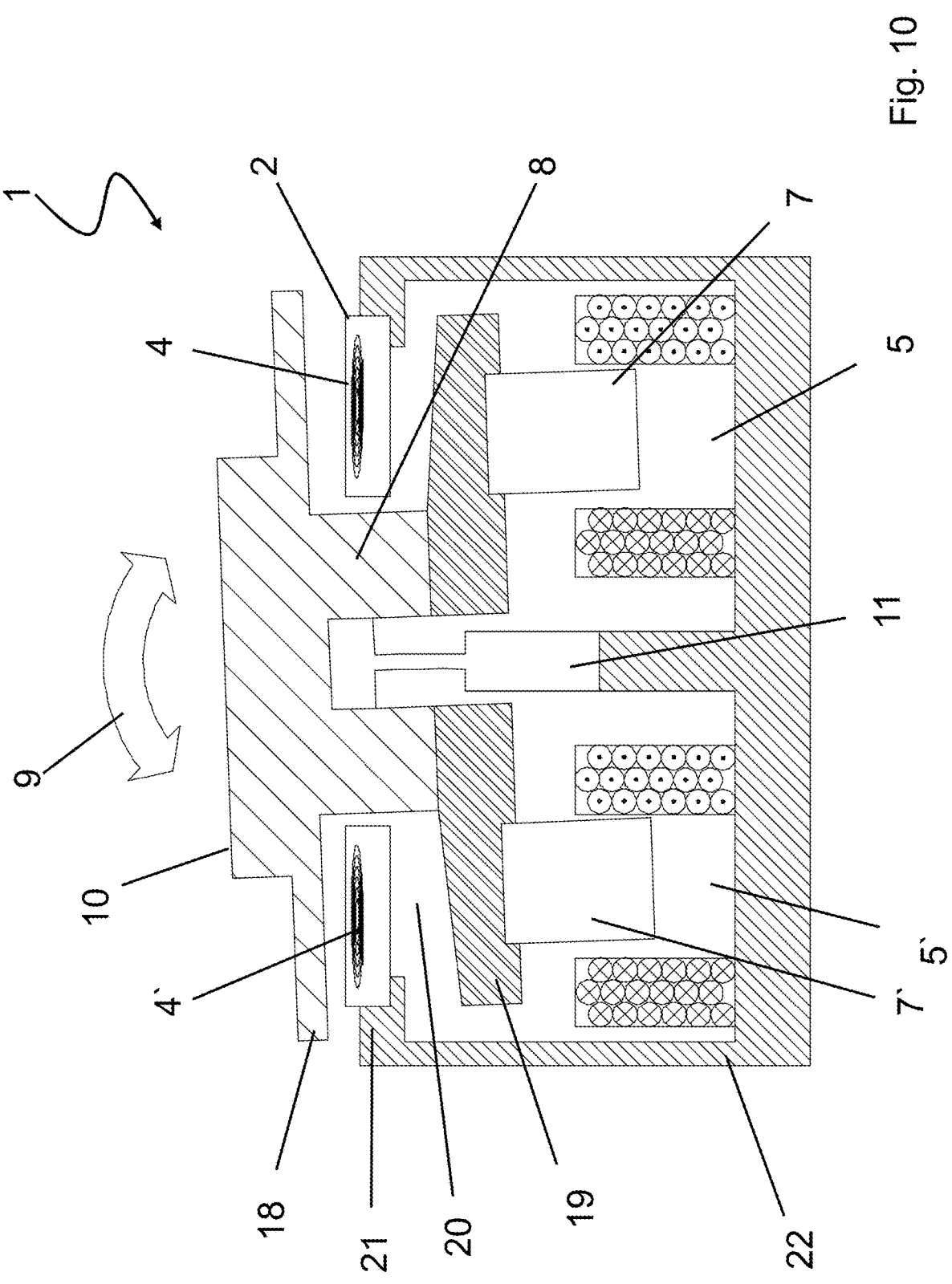
Figure 11:
Figure 11:

There are then various options for advantageously designing and refining the teaching of the present disclosure. For this purpose, reference is made on the one hand to the claims subordinate to claim 1 and on the other hand to the following explanation of exemplary embodiments of the present disclosure with reference to the drawing. In conjunction with the explanation of the exemplary embodiments of the present disclosure with reference to the drawing, designs and refinements of the teaching are also explained. The figures show:

FIG. 1 a schematic view of an embodiment of an FSM according to the present disclosure with a measuring element in the form of a flat substrate, FIG. 2 a schematic view of a measuring element in the form of a flat substrate with two sensor elements in the form of a coil, FIG. 3 a schematic view of a measuring element in the form of a flat substrate with two sensor elements which are designed as electrodes of capacitive sensors, FIG. 4 a schematic view of a measuring element with four sensor elements in the form of coils, FIG. 5 schematic views of two exemplary embodiments of measuring elements, each with four sensor elements in a differential arrangement, FIG. 6 a schematic view of a measuring element with three sensor elements for detecting movements about two axes, FIG. 7 a schematic view of a measuring element with additional temperature sensors in the form of meandering conductor loops, FIG. 8 a schematic view a measuring element with electronic components in the form of an electronic circuit, FIG. 9 in a schematic view of an embodiment of an FSM for the deflection of optical signals in two axes, comprising a measuring element with four sensor elements, FIG. 10 a schematic sectional view of an exemplary embodiment of an actuator-sensor system, and FIG. 11 a schematic exploded view of the actuator-sensor system according to FIG. 10.

FIG. 1 shows a fast steering mirror, abbreviated FSM 1, with a measuring element 2 in the form of a flat substrate 3. The figure shows the differential arrangement with two sensor elements 4, 4'. The FSM contains two actuators 5, 5' in the form of coils 6, 6', which can move a moving element 8 in an axis 9 via magnets 7, 7'. A deflecting element 10 is attached to the movable element 8, here in the form of a reflective coating. The movable element 8 is movably mounted via a fixed bearing in the form of a bending beam 11.

FIG. 2 shows a measuring element 2 in the form of a flat substrate 3 with two sensor elements 4, 4' in the form of a coil. The coil can be arranged either as a single-layer coil on the substrate or as a multi-layer coil in the layers of the substrate.

FIG. 3 shows a measuring element 2 in the form of a flat substrate 3 with two sensor elements 4, 4', which are formed as electrodes 12, 12' of capacitive sensors.

FIG. 4 shows a measuring element 2 with a total of four sensor elements 4, 4', 4", 4'" in the form of coils. Two sensor elements are arranged opposite each other, so that the movement around two axes (which are offset by 90° to each other) can be measured. There is a passage 13 in the center of the measuring element, through which the movable element which serves as a holder for the deflecting element can be stored centrally (not shown).

FIG. 5 shows a measuring element 2 with three sensor elements 4, 4', 4" for the detection of movements around two axes. The sensor elements are arranged at 120° to each other. A mathematical function is required to record the movement around the two axes, which includes not only of the difference between two sensor signals.

FIG. 6 shows two examples of measuring elements 2, 2', each with four sensor elements in a differential arrangement and each with a passage 13, 13' in the center. Measuring elements 2, 2' have recesses 14, 14'. These serve to enable the actuators (coil or magnet) to be brought closer to the movable element 8 in each case. This improves the power flow and reduces the design.

FIG. 7 shows a measuring element 2 with additional temperature sensors 15, 15', 15", 15'" in the form of meandering conductor loops. The temperature can be measured via the ohmic resistance of the conductor loops.

FIG. 8 shows a measuring element 2 which additionally contains electronic components 16 in the form of an electronic circuit. This circuit can be used for signal preprocessing, or it can already contain the complete evaluation circuit, or also the control electronics for the actuators. The circuit is contacted via soldering pads 17. Alternatively, a flexible conductor could already be integrated into the substrate (not shown).

FIG. 9 shows a FSM 1 for the redirection of optical signals in two axes with a measuring element 2 with four sensor elements 4, 4' (only two visible), a deflecting element 10 as a flat mirror and four actuators 5, 5', 5" (one 5'" not visible behind the other three). Two actuators each work together and can tilt the holder with the flat mirror about two axes. The measuring element has recesses 14, 14', 14" (one not visible), through which the magnets 7, 7', 7" (one 7'" not visible behind the other three) of the actuators are immersed in the coils FIGS. 10 and 11 show an actuator-sensor system in different representations. The movable element 8 has an upper part 18 and a lower part 19 which are rigidly connected to one another—for example by screwing, gluing or another suitable mechanical connection. The measuring element 2 is arranged in the waistline 20 of the movable element 8 and is connected to the housing 22 via a suitable holding structure 21. At the lower part 19 of the moving element 8, the magnets 7, 7' of the actuators 5, 5' are arranged, with the help of which the movable element 8 can be tilted specifically about the axis 9 (indicated by the arrow 9). The tilting of the movable element 8 takes place via a fixed bearing 11 in the form of a bending beam. Sensor elements 4, 4' are arranged in the axis direction above actuators 5, 5'. The lower part 19 of the moving element 8 shields the sensor elements 4, 4' from the actuators 5, 5'.

To avoid repetition with regard to further advantageous embodiments of the teaching according to the present disclosure, reference is made to the general part of the description and to the appended claims.

Finally, it should be expressly noted that the above-described exemplary embodiments of the teaching according to the present disclosure merely serve to discuss the claimed teaching, but do not restrict it to the exemplary embodiments.

LIST OF REFERENCE NUMERALS

1 FSM
2 measuring element
3 flat substrate
4, 4', 4", 4''' sensor elements
5, 5' actuators
6, 6' coils
7, 7', 7", 7''' magnets
8 movable element
9 axis
10 deflecting element
11 fixed bearing in the form of a bending beam
12, 12' electrodes
13 passage
14, 14', 14" recesses
15, 15', 15", 15''' temperature sensors
16 electronic components
17 soldering pads
18 upper part (movable element)
19 lower part (movable element)
20 waistline
21 holding structure
22 housing

The invention claimed is:

1. An actuator-sensor system for controlled diverting or deflecting of electromagnetic radiation in at least one axis (9), with an actuator (5) for mechanically moving a deflecting element (10), comprising:
   a measuring element (2) for sensing the position of the deflecting element (10),
   wherein the measuring element (2) includes a flat substrate (3) having at least one sensor element (4) and
   wherein the deflecting element (10) is arranged on a movable element (8) or is designed as part of the movable element (8) and in that the measuring element (2) is arranged in a waistline (20) of the movable element (8).

2. The actuator-sensor system according to claim 1, wherein the movable element (8) is formed from two parts.

3. The actuator-sensor system according to claim 1, wherein the substrate (3) comprises two or more sensor elements (4, 4'), and/or in that the substrate (3) consists of ceramic or a printed circuit board material.

4. The actuator-sensor system according to claim 3, wherein the substrate (3) is designed in one layer or in multiple layers, consisting of two or more layers.

5. The actuator-sensor system according to claim 1, wherein the sensor element (4) is designed either as a flat coil of an inductive sensor or an eddy current sensor or as an electrode of a capacitive sensor.

6. The actuator-sensor system according to claim 1, wherein the sensor element (4) is formed on a surface of the substrate (3).

7. The actuator-sensor system according to claim 3 wherein at least two sensor elements (4, 4') are provided in a differential arrangement,
   and/or in that at least two sensor elements (4, 4') are provided to record at least two movements, preferably independent of each other.

8. The actuator-sensor system according to claim 1, wherein the substrate (3) comprises electronics for the control of the at least one sensor element (4),
   and/or wherein the substrate (3) comprises a flexible conductor connection.

9. The actuator-sensor system according to claim 1, wherein the measuring element (2) comprises a connector to contact the at least one sensor element (4), wherein the connection is a plug arranged on the substrate (3) or solder points (17) arranged on the substrate (3) or a flexible conductor track integrated into the substrate (3).

10. The actuator-sensor system according to claim 1, wherein two axes (9) are provided which are rotated substantially by 90° to one another,
   and/or wherein the measuring element (2) comprises three sensor elements (4, 4', 4") rotated by 120° to each other.

11. The actuator-sensor system according to claim 1, wherein the measuring element (2) comprises four sensor elements (4, 4', 4", 4''') rotated by 90° to each other.

12. The actuator-sensor system according to claim 1, wherein the measuring element (2) comprises an integrated temperature sensor (15).

13. A fast steering mirror (FSM) with an actuator-sensor system according to claim 1.

14. A fast steering mirror (FSM) according to claim 3, wherein the FSM contains a deflecting element for diverting or deflecting electromagnetic radiation, in particular optical signals, light signals in the visible range, infrared signals, UV signals or signals in the EUV range, images, laser beams, etc.

15. The actuator-sensor system according to claim 9, wherein the measuring element (2) comprises a single connector to contact the at least one sensor element (4).

* * * * *